United States Patent [19]

Fukushima

[11] Patent Number: 5,521,594
[45] Date of Patent: May 28, 1996

[54] ROAD SURFACE CONDITION DETECTOR FOR AUTOMOTIVE VEHICLE

[75] Inventor: Yukio Fukushima, Himeji, Japan

[73] Assignee: Mitsubishi Denki Kabushiki Kaisha, Tokyo, Japan

[21] Appl. No.: 201,429

[22] Filed: Feb. 24, 1994

[30] Foreign Application Priority Data

Feb. 25, 1993  [JP]  Japan ..................... 5-036577

[51] Int. Cl.⁶ ..................................... G08G 1/00
[52] U.S. Cl. .................. 340/901; 340/905; 340/602; 340/904; 180/167; 367/87
[58] Field of Search ..................... 340/905, 601, 340/901, 602, 580, 582; 180/167, 169; 367/87

[56] References Cited

U.S. PATENT DOCUMENTS

| | | | |
|---|---|---|---|
| 4,274,091 | 6/1981 | Decker | 340/583 |
| 4,492,952 | 1/1985 | Miller | 340/901 |
| 5,159,837 | 11/1992 | Wada | 340/901 |
| 5,315,295 | 5/1994 | Fujii | 340/936 |
| 5,350,035 | 9/1994 | Bodier et al. | 180/271 |
| 5,362,139 | 11/1994 | Watanabe | 303/96 |

FOREIGN PATENT DOCUMENTS

| | | |
|---|---|---|
| 93328 | 6/1986 | Japan . |
| 97836 | 6/1987 | Japan . |
| 269388 | 11/1991 | Japan . |

*Primary Examiner*—Glen Swann
*Assistant Examiner*—Daryl C. Pope
*Attorney, Agent, or Firm*—Sughrue, Mion, Zinn, Macpeak & Seas

[57] ABSTRACT

A road surface condition detector for detecting a dry/wet condition of a road surface includes an ultrasonic wave receiver 2 for picking up the ultrasonic noise generated by a road wheel tire 1, which increases conspicuously when the R is wet. The output of the ultrasonic wave receiver 2 is amplified by a amplifier 21, and the absolute level thereof is detected by an absolute level detector 22, and the absolute level is smoothed by a received-wave intensity detector 20. The smoothed signal is compared with a reference voltage Vt to determine the road surface condition. Preferably, the reference voltage Vt is varied in accordance with the vehicle speed. When the automotive vehicle is provided with ultrasonic wave transmitter/receiver units 3a and 3b, the ultrasonic noise component is extracted from the received signal by an ultrasonic noise intensity detector circuit 40, and the extracted component is compared with a reference voltage level to determine the road surface condition.

15 Claims, 14 Drawing Sheets

1MS/DIV

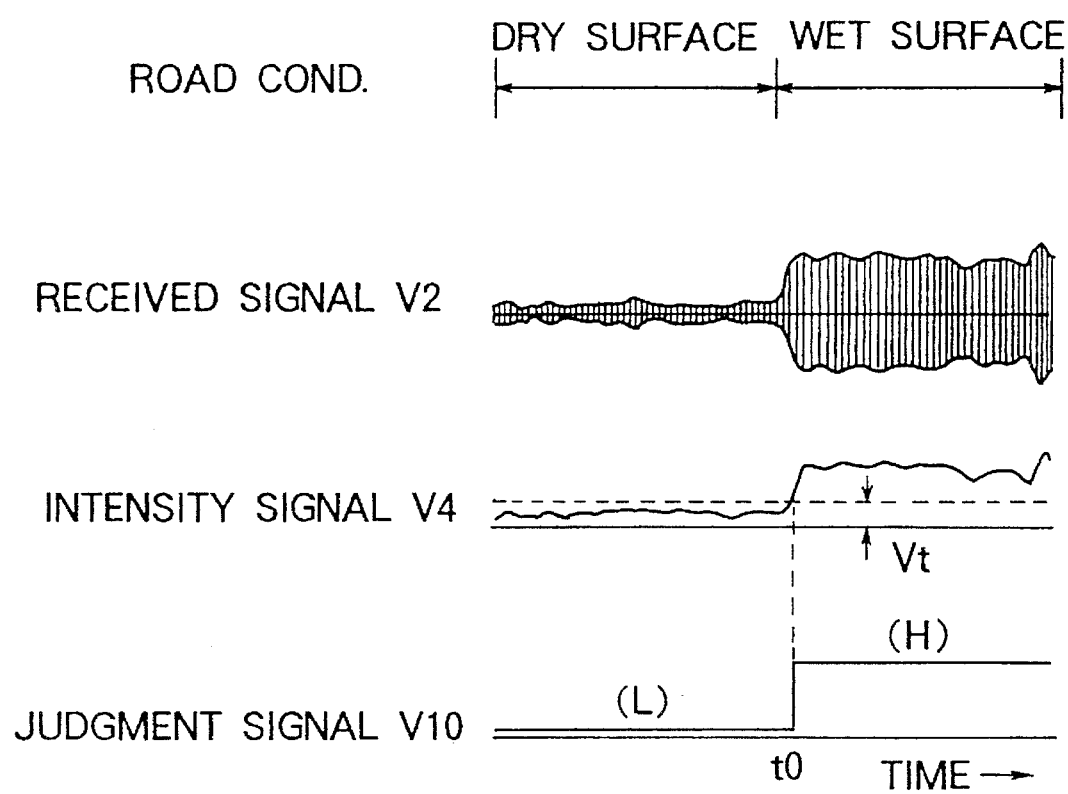

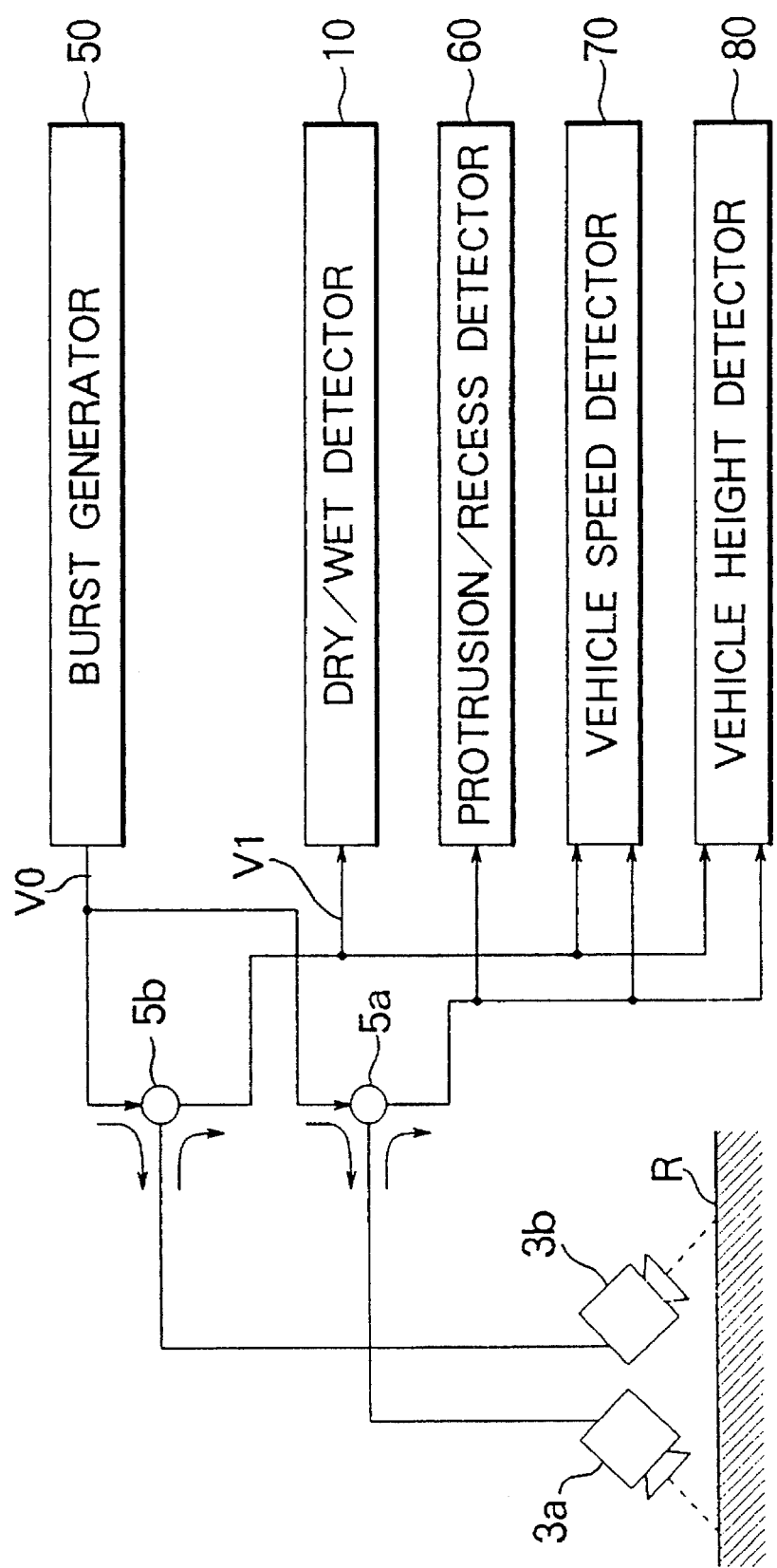

ROAD SURFACE CONDITION DETECTOR FOR AUTOMOTIVE VEHICLE

BACKGROUND OF THE INVENTION

This invention relates to road surface condition detectors mounted on automotive vehicles for detecting the dry/wet condition of the driving road surface for the purpose of adjusting the parameters of the automatic control system of the suspensions and the brakes, etc, to ensure safety and enhance the reliability of the control system.

In the case of a conventional typical road surface condition detector, the dry/wet condition of the driving road surface is detected on the basis of the position of the wiper switch selected by the driver. Namely, when it rains during driving, the driver of the automotive vehicle turns on the wiper switch and selects a higher speed position thereof as the rain gets harder. Thus, the dry/wet condition of the road surface can be determined indirectly from the position of the wiper switch.

However, this method of determining the road surface condition is based on the driver's judgment, and hence is affected largely by the human inconsistency or the variation in the judgment of the respective individuals upon several occasions. Further, the wiper switch position selected by the driver does not necessarily agree with the dry/wet condition of the road surface. For example, when the rain stops, the wiper switch is turned off while the road surface is still wet. Hence, the information thus obtained is unreliable.

Thus, it has been proposed to dispose a sensor near a road wheel tire to detect the dry/wet condition of the road surface directly. Namely, the amount of the water, mud, sand, etc., splashed by the road wheel tire during driving time is detected by an impulse pressure sensor or a water amount sensor. This type of road surface condition detector is disclosed, for example, in Japanese Laid-Open Patent (Kokai) Nos. 61-98328 and 62-97836.

The road surface condition detector using a sensor disposed near a road wheel tire, however, has the following disadvantage. Namely, since the sensor is contaminated by the water, mud, sand, etc., which directly hits it, the device lacks durability. Thus the road surface condition detector can hardly be used in practical applications.

SUMMARY OF THE INVENTION

It is therefore an object of this invention to provide a road surface condition detector for automotive vehicle which is capable of detecting the dry/wet condition of the road surface accurately and reliably over a long service period.

The above object is accomplished in accordance with this invention by a road surface condition detector for an automotive vehicle including: receiver means mounted on a body of an automotive vehicle for receiving ultrasonic noise generated by a road wheel tire of the automotive vehicle, the receiver means exhibiting a directivity toward a contact surface between the road wheel tire and a road surface; intensity detector means, coupled to the receiver means, for detecting an intensity of the ultrasonic noise from an output of the receiver means and generating an intensity signal corresponding to the intensity of the ultrasonic noise; and judgment means, coupled to the intensity detector means, for determining a condition of the road surface from the intensity signal output from the intensity detector means.

Preferably the judgment means includes comparison means for comparing a level of the output of the intensity detector means with a reference voltage level, and the road surface condition detector further includes: vehicle speed detector means for detecting a vehicle speed of the automotive vehicle; and reference voltage setting circuit means, coupled to the vehicle speed detector means, for setting the reference voltage level approximately proportionally to the vehicle speed. It is further preferred that the intensity detector means includes: absolute level detector means, coupled to the receiver means, for detecting an absolute level of the output of the receiver means; and smoothing circuit means, coupled to the absolute level detector means, for smoothing the absolute level output from the absolute level detector means, thereby obtaining the intensity signal.

Furthermore, it is preferred that the road surface condition detector further includes: transmitter means, mounted on the body of the automotive vehicle, for transmitting bursts of ultrasonic waves intermittently toward the road surface; wherein the intensity detector means includes first extraction means, coupled to the detector means, for extracting a first component corresponding to the ultrasonic noise from an output of the receiver means, the judgment means determining the road surface condition from the first component extracted by the first extraction means.

Where the transmitter means transmits the ultrasonic wave bursts intermittently at a predetermined period, the first extraction means includes: minimum level detector means, coupled to the receiver means, for holding a minimum level of the output of the receiver means which is reached during each period of the ultrasonic wave bursts; and integrator circuit means, coupled to the minimum level detector means, for averaging the minimum levels output from the minimum level detector means, over a predetermined length of time. Alternatively, the first extraction means includes: an analog switch coupled to the receiver means and closed exclusively during intervals when a reflection of the ultrasonic wave bursts is not received by the receiver means, the analog switch thereby supplying the output of the receiver means containing exclusively the ultrasonic noise; and integrator circuit means, coupled to the analog switch, for averaging outputs from the analog switch over a predetermined length of time.

It is further preferred that the intensity detector means includes second extraction means, coupled to the detector means, for extracting a second component corresponding to a reflection of the ultrasonic wave bursts from the output of the receiver means; and the judgment means includes: comparison calculation circuit means, coupled to the first and the second extraction means, for calculating a road surface condition signal from the first and the second component; the judgment means determining the road surface condition on the basis of the road surface condition signal. The comparison calculation circuit means calculates either the difference between the first and the second component or ratio of the first and the second component as the road surface condition signal.

Preferably, the intensity detector means includes: absolute level detector means, coupled to the receiver means, for detecting an absolute level of the output of the receiver means; and smoothing circuit means, coupled to the absolute level detector means, for smoothing the absolute level output from the absolute level detector means; wherein the extraction means is coupled to the smoothing circuit means and extracts the components from an output of the smoothing circuit means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 3 is a timing chart showing the waveforms of various signals;

FIG. 7 is a block diagram showing the structure of still another road surface condition detector according to this invention which uses ultrasonic wave transmitter/receiver unit;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
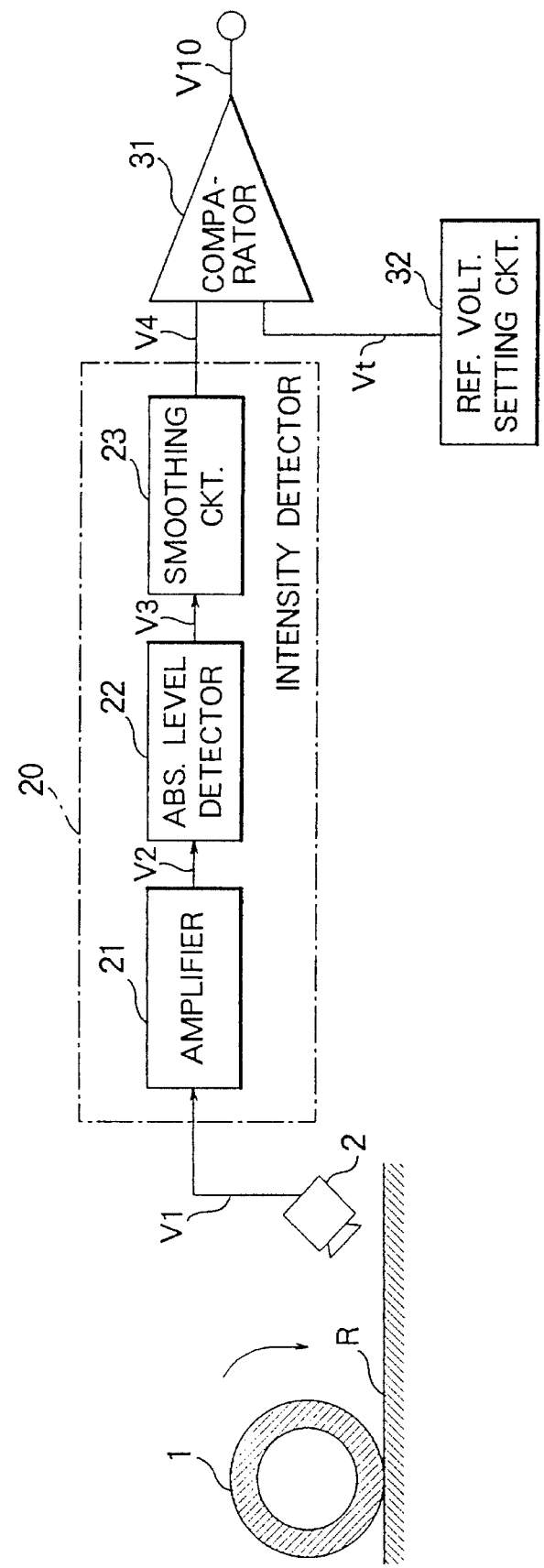
FIG. 1 a block diagram showing the structure of a road surface condition detector according to this invention.
Figure 2A:
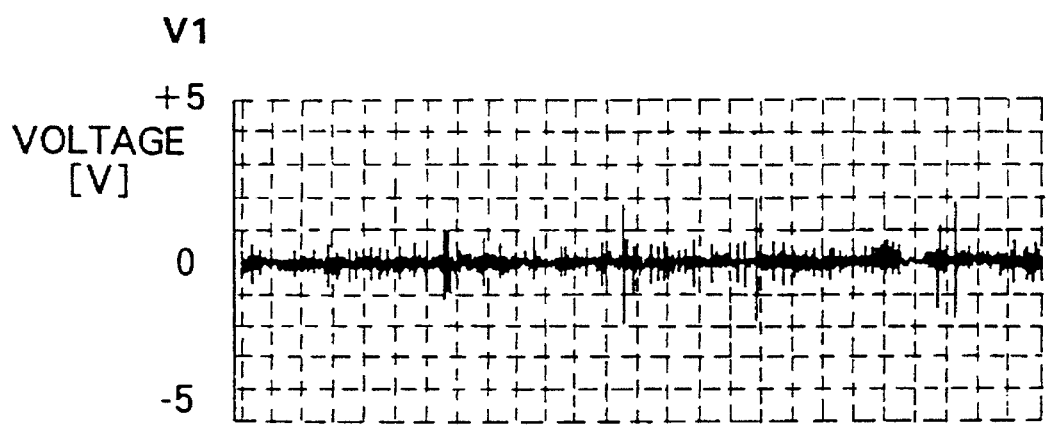
FIG. 2a shows the waveform of the received-wave signal V1 which is obtained experimentally when the road surface is dry.
Figure 2B:
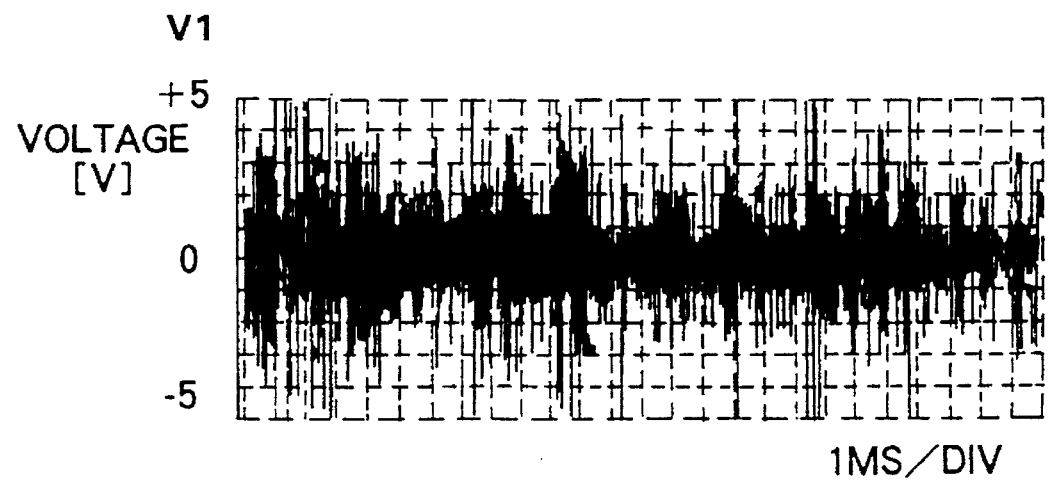
FIG. 2b shows the waveform of the received-wave signal V1 which is obtained experimentally when the road surface is wet.

FIG. 1 a block diagram showing the structure of a road surface condition detector according to this invention. FIG. 2a shows the waveform of the received-wave signal V1 which is obtained experimentally when the road surface is dry. FIG. 2b shows the waveform of the received-wave signal V1 which is obtained experimentally when the road surface is wet. FIG. 3 is a timing chart showing the waveforms of various signals.

As shown in FIG. 1, near a road wheel tire 1 of an automotive vehicle (not shown) running upon the road surface R is disposed an ultrasonic wave receiver 2. The ultrasonic wave receiver 2 is attached upon the automotive vehicle in front or at a side of the road wheel tire 1 where it is seldom hit by the water, mud, sand, etc., splashed by the road wheel tire 1. The ultrasonic wave receiver 2 consists, for example, of a water-proof in-air type ultrasonic sensor using a piezoelectric ceramic, and exhibits a directivity toward the direction of the contact surface between the road wheel tire 1 and the road surface R.

A received-wave intensity detector 20 for detecting the intensity of the received-wave signal V1 output from the ultrasonic wave receiver 2 includes: an amplifier 21 for amplifying the received-wave signal V1; an absolute level detector 22 including a diode, etc., for rectifying the received-wave signal V1 and thereby obtaining an absolute level signal V3 corresponding to the absolute level of the amplified waveform signal V2; and a smoothing circuit 23 for smoothing the the absolute level signal V3 to obtain a received-signal intensity signal V4. A comparator 81 compares the received-signal intensity signal V4 output from the received-wave intensity detector 20 with a reference voltage Vt supplied from a reference voltage setting circuit 32 and outputs the result of comparison as the judgment signal V10.

Next the operation of the circuit of FIG. 1 is described in detail.

FIG. 2a shows the waveform of the received-wave signal V1 which is obtained experimentally when the road surface is dry. FIG. 2b shows the waveform of the received-wave signal V1 which is obtained experimentally when the road surface is wet. The waveforms have been obtained under the following condition. An ultrasonic sensor 2 with a detection frequency band at 200 kHz is attached in front of a rear road wheel tire 1 of the automotive vehicle at 40 degrees relative to road surface R. The ultrasonic wave receiver 2 is directed toward the contact surface between the road wheel tire 1 and the road surface R. FIG. 2a shows a voltage waveform V1 output from the ultrasonic wave receiver 2 when the automotive vehicle is driven at 30 km/h upon a dry asphalt r. FIG. 2b shows the voltage waveform V1 output from the ultrasonic wave receiver 2 when the asphalt road surface R is wet.

As is evident from FIGS. 2a and 2b, the signal levels are much higher when the automotive vehicle is driven on a wet road surface R. Running upon a wet road surface R, the road wheel tire 1 dashes the water to the road surface R and the body of the automotive vehicle, thereby generating the ultrasonic noise.

The received-wave signal V1, the level or the intensity of which indicates the road surface condition, is input to the received-wave intensity detector 20. Within the received-wave intensity detector 20, the amplifier 21 amplifies the received-wave signal V1 by about from 80 dB to 100 dB, to obtain the amplified waveform signal V2. Further, the absolute level detector 22 generates the absolute Level signal V3 corresponding to the absolute level of the amplified waveform signal V2. Finally, the smoothing circuit 23 smoothes the absolute level signal V3 to obtain the received-signal intensity signal V4. FIG. 3 show the amplified waveform signal V2 and the intensity signal V4 in relation to the road surface condition.

The comparator 31 compares the level of the received-signal intensity signal V4 with the reference voltage Vt to obtain the logical judgment signal V10. When the level of the received-signal intensity signal V4 is less than the reference voltage Vt, the judgment signal V10 is at the low level L. When, on the other hand, the level of the received-signal intensity signal V4 is greater than the reference voltage Vt, the judgment signal V10 is at the high level H. The waveform of the judgment signal V10 is shown at the bottom of FIG. 3.

Next, referring to FIG. 3, the operation of the circuit of FIG. 1 is described in greater detail. Up to the time point $t_0$, the automotive vehicle is running upon a dry asphalt road surface. After the time point $t_0$, the road surface becomes wet. As shown by the waveform V2, the absolute level of the amplified waveform signal V2 rises at time point $t_0$ from lower to higher levels. Thus, the received-signal intensity signal V4 rises above the reference voltage Vt at time point $t_0$. Consequently, the judgment signal V10 rises from the low level L to the high level H at the time point $t_0$, indicating that the road surface has become wet after time point $t_0$. The reference voltage Vt is set at an appropriate level such that the level of the received-signal intensity signal V4 exceeds the reference voltage Vt when the road surface R is wet and falls below the reference voltage Vt when the road surface R is dry. The various control parameters of the automatic driving control system are changed in accordance with the level of the judgment signal V10.

In the case of the circuit of FIG. 1, the reference voltage Vt is set at a fixed level. However, when the road surface is wet, the intensity of the ultrasonic noises increases substantially as the vehicle speed increases. Thus, the level of the reference voltage Vt may be raised as the vehicle speed increases. The relation between the vehicle speed and the appropriate level of the reference voltage Vt may be determined experimentally, and a table showing the relation may be stored in a memory of the reference voltage setting circuit 32. Looking up the table, the reference voltage setting circuit 32 may change the level of reference voltage Vt in accordance with the vehicle speed.

Figure 4:
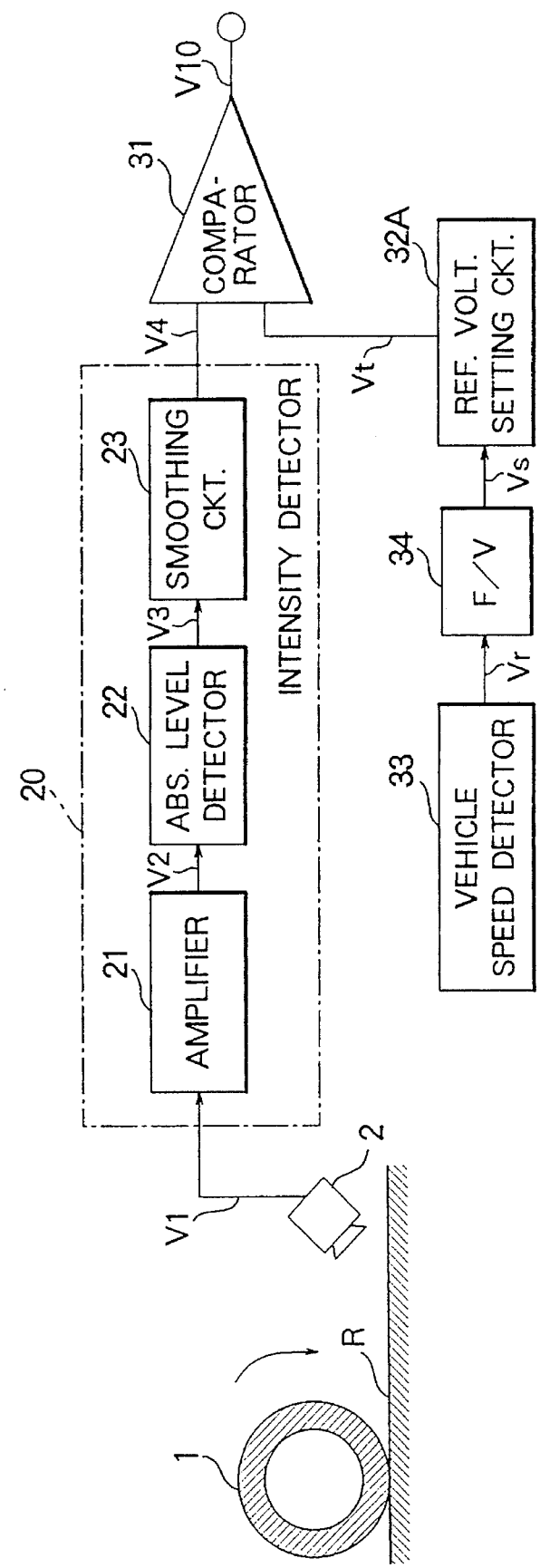
FIG. 4 is a block diagram showing the structure of another road surface condition detector according to this invention.

FIG. 4 is a block diagram showing the structure of another road surface condition detector according to this invention, by which the level of the reference voltage Vt is changed in accordance with the vehicle speed. The road wheel tire 1, the ultrasonic wave receiver 2, the received-wave intensity detector 20 (including the amplifier 21, the absolute level detector 22, and the smoothing circuit 23) and the comparator 31 are similar to those of FIG. 1.

A vehicle speed detector 33 detects the rotation speed of the road wheels of the automotive vehicle and outputs the vehicle speed pulse signal Vr whose frequency corresponds to the vehicle speed. A frequency/voltage converter 34 converts the vehicle speed pulse signal Vr into a vehicle speed signal Vs whose voltage level corresponds to the pulse repetition frequency of the vehicle speed pulse signal Vr. In response to vehicle speed signal Vs, the reference voltage setting circuit 32A generates a reference voltage Vt whose level is approximately proportional to the vehicle speed represented by the vehicle speed signal Vs. The comparator 31 compares the level of the received-signal intensity signal V4 with the reference voltage Vt to obtain the logical judgment signal V10. When the level of the received-signal intensity signal V4 is less than the reference voltage Vt, the comparator 31 outputs the judgment signal V10 at the low level L, and when the level of the received-signal intensity signal V4 is greater than the reference voltage Vt, the judgment signal V10 at the high level H.

Figure 5:
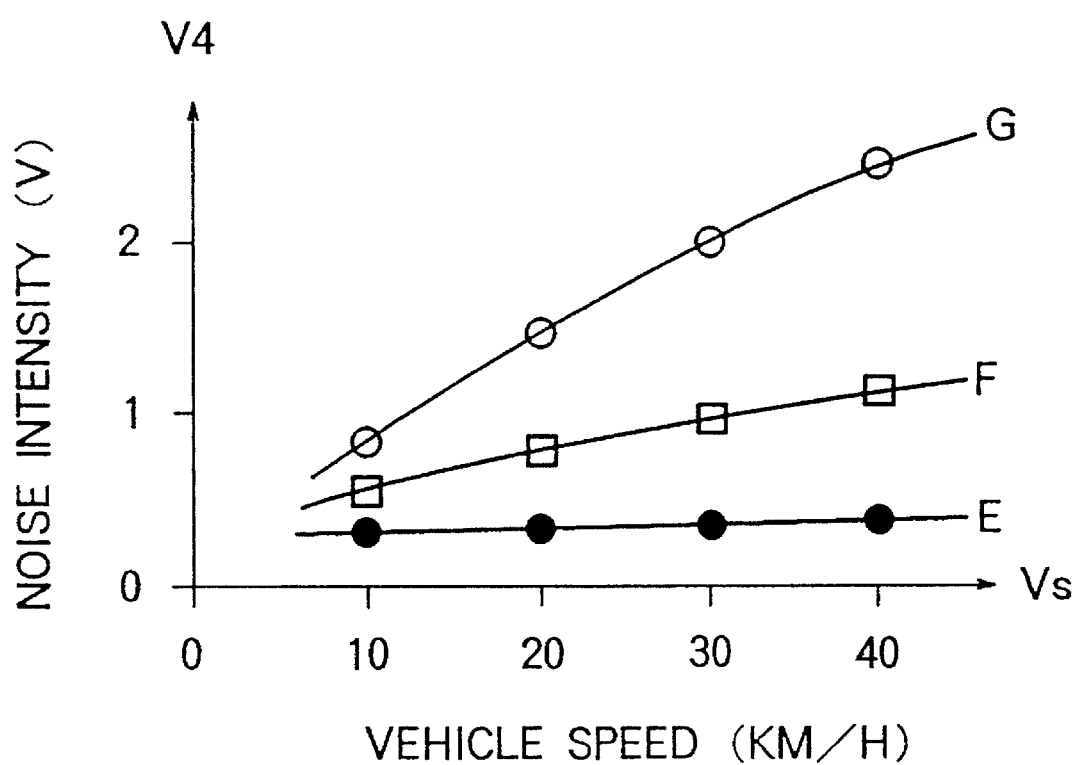
FIG. 5 shows experimentally obtained relations between the vehicle speed (vehicle speed signal Vs) and the intensity of the ultrasonic noise (received-signal intensity signal V4) under various road surface conditions.

FIG. 5 shows experimentally obtained relations between the vehicle speed (vehicle speed signal Vs) and the intensity of the ultrasonic noise (received-signal intensity signal V4) under various road surface conditions, wherein: the curve E shows the relation when the automotive vehicle is running upon a dry asphalt road surface; the curve F shows the relation when the automotive vehicle is running upon a moderately wet asphalt road surface; and the curve G shows the relation when the automotive vehicle is running upon a water-covered asphalt road surface.

Upon a dry asphalt road surface, the level of the ultrasonic noise remains substantially at a constant low level irrespective of the vehicle speed Vs (see the curve E). The low level output E at about 0.3 V of vehicle speed signal Vs developed when running upon a dry asphalt road surface is due primarily to the electric rather than the ultrasonic noise. Upon a moderate wet or water-covered road surface (see curves F and G), on the other hand, the received-signal intensity signal V4 corresponding to the level of the ultrasonic noise is approximately proportional to the vehicle speed Vs. The experimentally obtained relations illustrated in FIG. 5 show that when the road surface is wet, the vehicle speed signal Vs increases approximately proportionally as the vehicle speed Vs increases.

Thus, the reference voltage setting circuit 32A changes the level of the reference voltage Vt approximately proportionally with the level of the vehicle speed signal Vs. The reference voltage setting circuit 32A includes a data map or table storing the relation between the vehicle speed signal Vs and the level of the reference voltage Vt. The relation between the vehicle speed signal Vs and the level of the reference voltage Vt may be represented by a curve which lies between the curves E and F in FIG. 5. Then, the output of the comparator 31 is at the high level H when the road surface is more than moderately wet, and at the low level L when the road surface is dry. Since the reference voltage Vt increases as the vehicle speed increases, an accurate judgment can be made irrespective of the vehicle speed.

Figure 6:
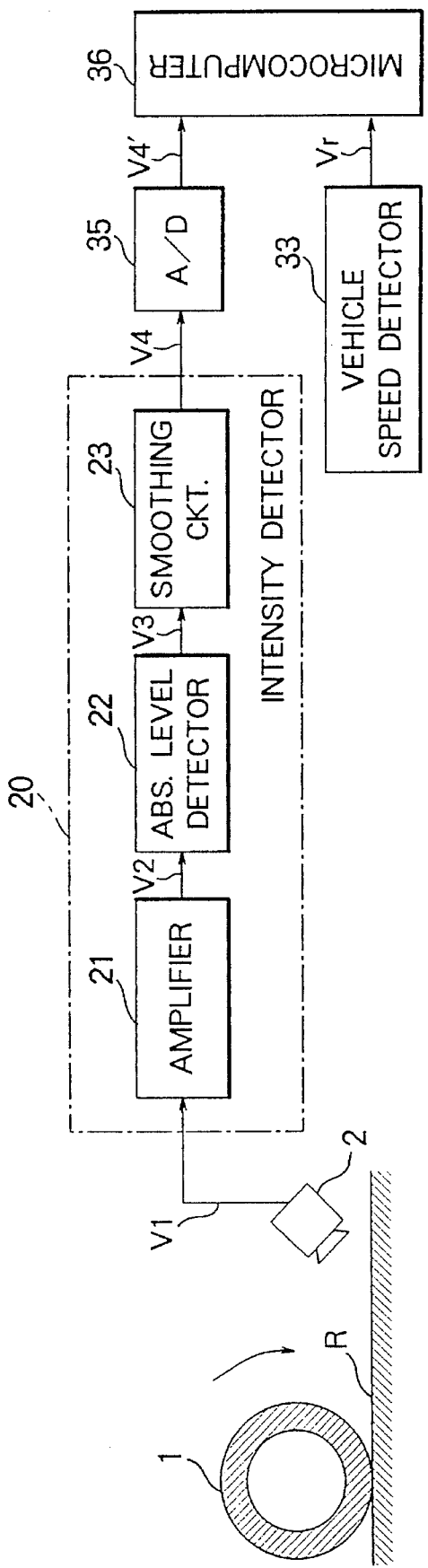
FIG. 6 is a block diagram showing the structure of still another road surface condition detector according to this invention which uses a microcomputer to judge the road surface condition.

FIG. 6 is a block diagram showing the structure of still another road surface condition detector according to this invention which uses a microcomputer to judge the road surface condition. The road wheel tire 1, the ultrasonic wave receiver 2, and the received-wave intensity detector 20 (including the amplifier 21, the absolute level detector 22, and the smoothing circuit 23) are similar to those of FIGS. 1 and 4 described above. Since a microcomputer 36 is used for making the judgment, an A/D converter 35 is inserted between the output of the received-wave intensity detector 20 and the microcomputer 36. The A/D converter 35 converts the analog received-signal intensity signal V4 into a corresponding digital received-signal intensity signal V4' and inputs it to the microcomputer 36. On the other hand, the vehicle speed pulse signal Vr output from the vehicle speed detector 33 is directly supplied to the input interface of the microcomputer 36. The microcomputer 36 includes a conversion table stored in the memory thereof, by which the microcomputer 36 can determine the wetting degree of the road surface R from the received-signal intensity signal V4' and the frequency of the vehicle speed pulse signal Vr. Then, the various driving control parameters of the automatic driving control system may be changed in accordance with the wetting degree. Thus, a finer adjustment of the control parameters can be realized by the microcomputer 36.

Figure 8A:
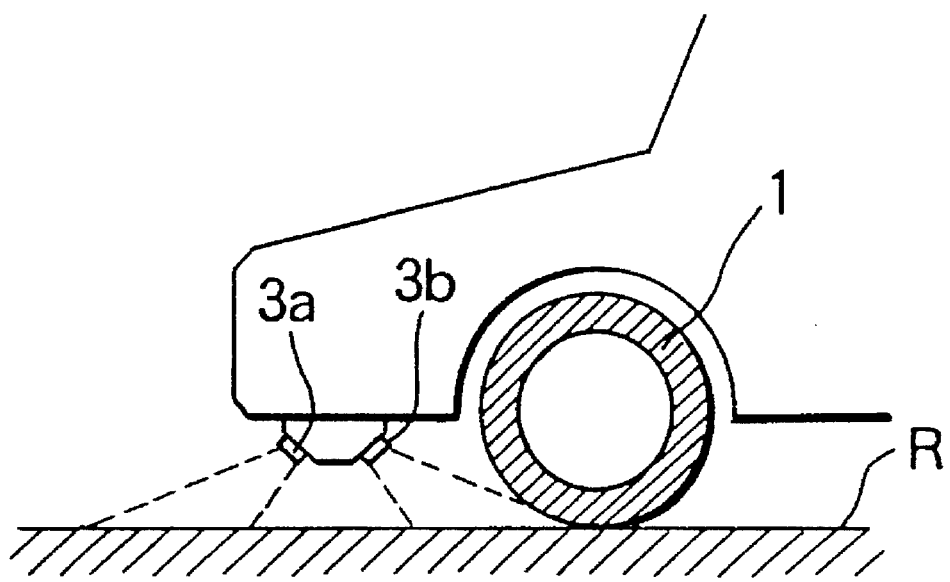
FIG. 8a is a schematic partial side view of an automotive vehicle showing two ultrasonic wave transmitter/receiver units of FIG. 7 as attached near the road wheel tire.

FIG. 7 is a block diagram showing the structure of still another road surface condition detector according to this invention which uses ultrasonic wave transmitter/receiver unit. FIG. 8a is a schematic partial side view of an automotive vehicle showing two ultrasonic wave transmitter/receiver units of FIG. 7 as attached near the road wheel tire.

Figure 8B:
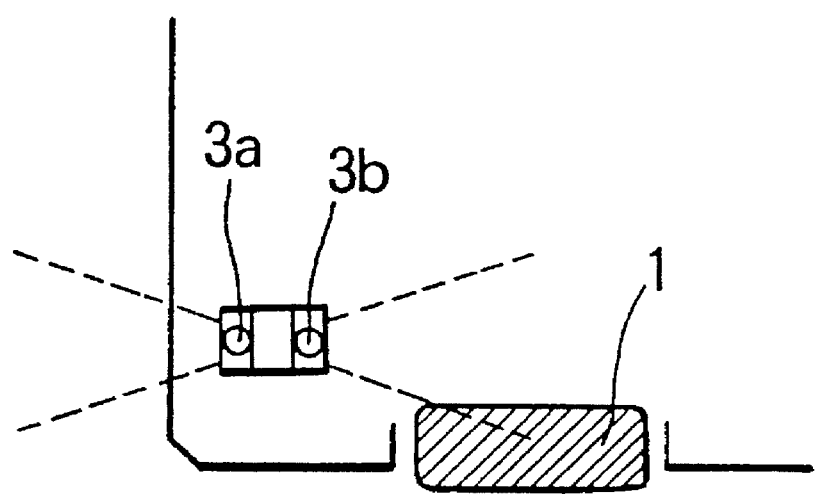
FIG. 8b is a schematic partial bottom view of the automotive vehicle of FIG. 8a showing the two ultrasonic wave transmitter/receiver units attached near the road wheel tire.
Figure 9:
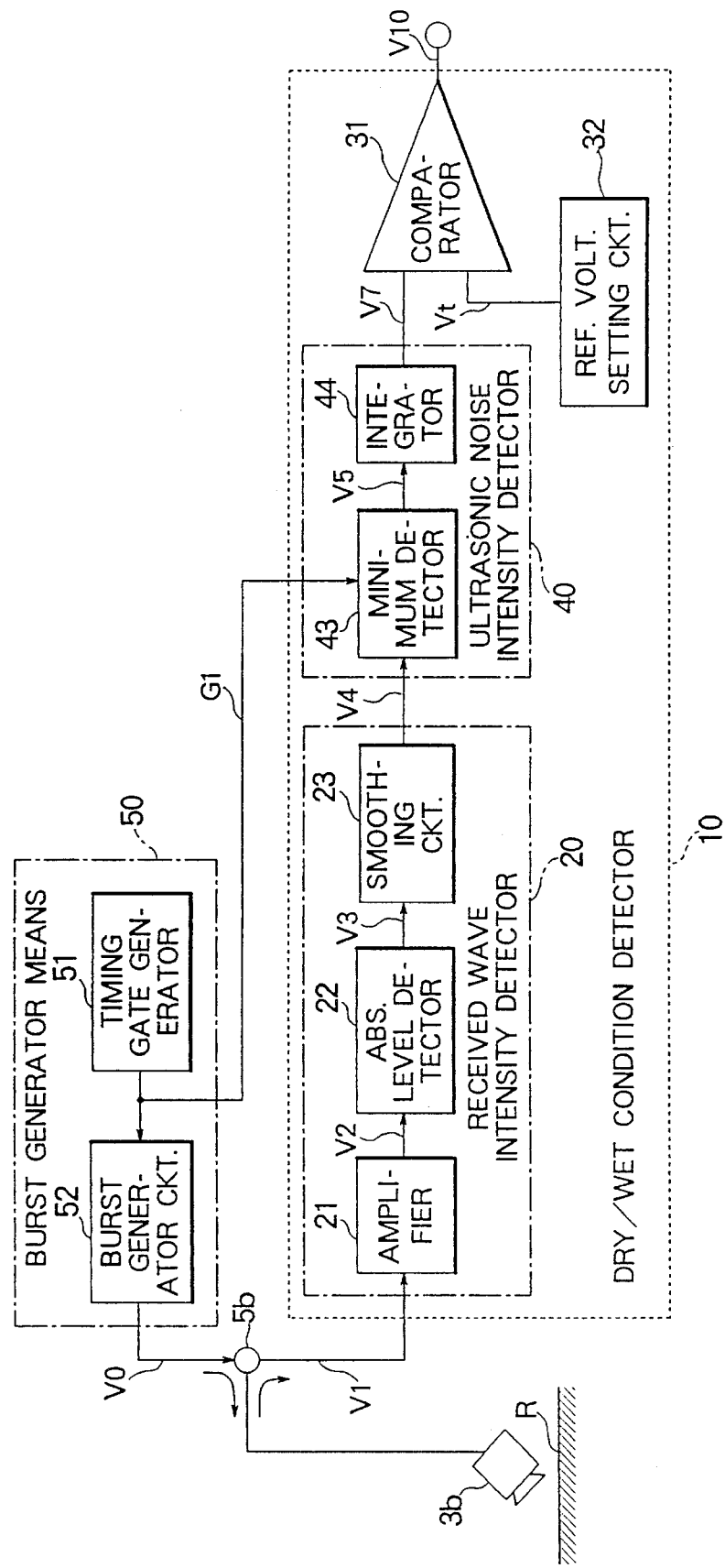
FIG. 9 is a block diagram showing a part of the circuit of FIG. 7 including the dry/wet road surface condition detector 10 in greater detail.
Figure 10:
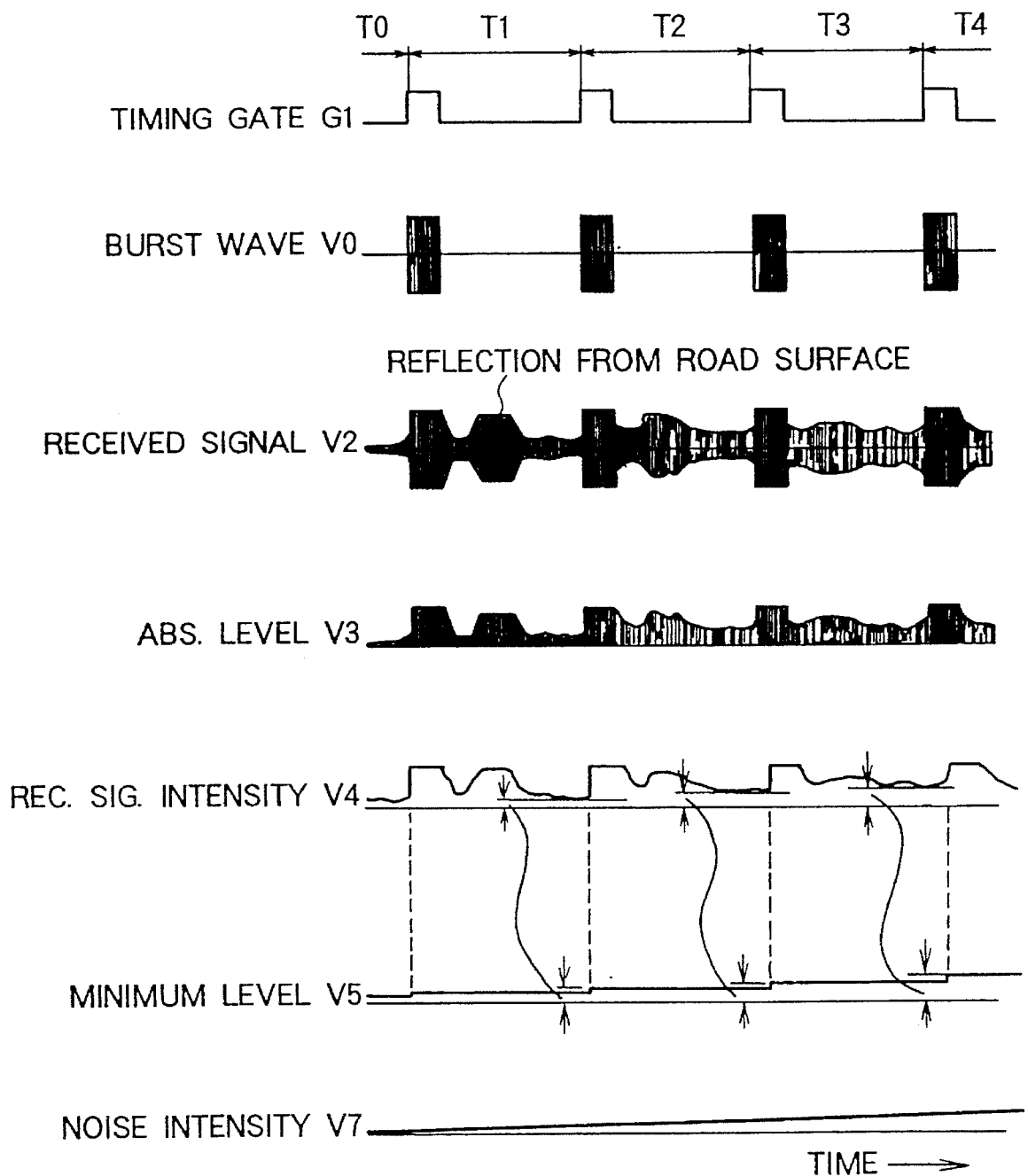
FIG. 10 is a timing chart showing the waveforms of various signals in the circuit of FIG. 9.

FIG. 8b is a schematic partial bottom view of the automotive vehicle of FIG. 8a showing the two ultrasonic wave transmitter/receiver units attached near the road wheel tire. FIG. 9 is a block diagram showing a part of the circuit of FIG. 7 including the dry/wet road surface condition detector 10 in greater detail. FIG. 10 is a timing chart showing the waveforms of various signals in the circuit of FIG. 9.

The road surface condition detector circuit of FIG. 7 includes two ultrasonic wave transmitter/receiver units 3a and 3b. As shown in FIGS. 8a and 8b, the ultrasonic wave transmitter/receiver units 3a and 3b are attached on the bottom of the automotive vehicle near a front road wheel tire 1. The front ultrasonic wave transmitter/receiver unit 3a is directed forward at 45 degrees to the road surface R. The rear ultrasonic wave transmitter/receiver unit 3b is directed backward at 45 degrees to the road surface R. The directivity angle range of the ultrasonic wave transmitter/receiver unit 3b includes the contact surface between the road wheel tire 1 and the road surface R.

The ultrasonic wave transmitter/receiver units 3a and 3b are coupled to transmission/reception switching circuits 5a and 5b, respectively. The burst wave signal V0 generated by a burst wave generator means 50 is supplied through the transmission/reception switching circuit 5a to the ultrasonic wave transmitter/receiver unit 3a and is transmitted therefrom as an intermittent ultrasonic burst wave. The ultrasonic signal received by the ultrasonic wave transmitter/receiver unit 3a is supplied through the transmission/reception switching circuit 5a to a road surface protrusion/recess detector 60, a vehicle speed detector 70, and a vehicle height detector 80. Similarly, the burst wave V0 generated by the burst wave generator means 50 is supplied through the transmission/reception switching circuit 5b to the ultrasonic wave transmitter/receiver unit 3b and is transmitted therefrom as an intermittent ultrasonic burst wave. The signal received by the ultrasonic wave transmitter/receiver unit 3b is supplied through the transmission/reception switching circuit 5b to a dry/wet road surface condition detector 10, the vehicle speed detector 70, and the vehicle height detector 80. The ultrasonic wave transmitter/receiver unit 3b receives not only the reflection of the intermittent ultrasonic burst wave but also the ultrasonic noise generated by the road wheel tire 1 rolling upon the road surface R.

As described below, the dry/wet road surface condition detector 10 includes an ultrasonic noise intensity detector circuit for selecting the ultrasonic noise from received-wave signal V1, which noise is received when the reflection of the burst wave is not present. The dry/wet road surface condition detector 10 thus extracts the ultrasonic noise from the received-wave signal V1 and detects the dry/wet road surface condition therefrom. The structure and operation the dry/wet road surface condition detector 10 is described in detail below referring to FIG. 9.

On the basis of intensity of the received signal from the ultrasonic wave transmitter/receiver unit 3a, the road surface protrusion/recess detector 60 determines the dimension of the protrusions and the recesses upon the road surface R. Namely, in response to the outputs of the burst wave generator means 50, the ultrasonic wave transmitter/receiver unit 3a transmits ultrasonic burst waves periodically, and the reflection signal received by the ultrasonic wave transmitter/receiver unit 3a supplied through the transmission/reception switching circuit 5a to the road surface protrusion/recess detector 60. On the basis of the intensity of the received reflection signal, the road surface protrusion/recess detector 60 determines the dimension of the protrusions and the recesses upon the road surface R. The road surface protrusion/recess detector 60 includes, for example, a diode for rectifying the signal received from the ultrasonic wave transmitter/receiver unit 3a, thereby obtaining the absolute level thereof. Further, the road surface protrusion/recess detector 60 includes an integrator circuit for integrating the absolute level of the received signal for a predetermined length of time. The level of the integration signal corresponds to the state of the protrusions and the recesses upon the road surface R.

Further, on the basis of the frequencies of the received signals from the ultrasonic wave transmitter/receiver units 3a and 3b, the vehicle speed detector 70 determines the vehicle speed relative to the road surface R. Namely, due to the Doppler effect, the frequencies of the ultrasonic burst waves transmitted from the ultrasonic wave transmitter/receiver units 3a and 3b and reflected from the road surface R change, in dependence upon the vehicle speed. Namely, the frequency of the burst wave signal received by the ultrasonic wave transmitter/receiver unit 3a rises as the vehicle speed increases, while the frequency of the burst wave signal received by the ultrasonic wave transmitter/receiver unit 3b falls as the vehicle speed increases. Thus, the vehicle speed detector 70 includes, for example, PLL (phase-locked loop) circuits for determining the frequencies of the received reflection signals, and calculates the difference between the frequencies of the two received signals. The frequency difference corresponds to the Doppler frequency deviation. Further, the vehicle speed detector 70 effects temperature compensation, etc., upon the frequency difference to obtain the vehicle speed relative to the road surface R.

On the other hand, the vehicle height detector 80 determines the vehicle height on the basis of the time length between the transmission and the reception of of the ultrasonic burst waves. Namely, the time required by the ultrasonic burst waves transmitted forward from the ultrasonic wave transmitter/receiver units 3a and 3b, reflected at the road surface R, and then backward therefrom to the ultrasonic wave transmitter/receiver units 3a and 3b depends on the vehicle height. Thus, the vehicle height detector 80 measures the time lengths between the generation and the reception of each burst wave, and determines the vehicle height on the basis of the measured time lengths, after making a necessary temperature compensation, etc.

Next, referring to FIGS. 9 and 10, the operation of the dry/wet road surface condition detector 10 is described in detail. FIG. 9 is a block diagram showing a part of the circuit of FIG. 7 including the dry/wet road surface condition detector 10 in greater detail. FIG. 10 is a timing chart showing the waveforms of various signals in the circuit of FIG. 9. In FIG. 9, the ultrasonic wave transmitter/receiver unit 3b, the transmission/reception switching circuit 5b, the dry/wet road surface condition detector 10, the received-wave intensity detector 20 (including the amplifier 21, the absolute level detector 22, and the smoothing circuit 23), the comparator 31, the reference voltage setting circuit 32, and the burst wave generator means 80 correspond to those of FIG 7.

The burst wave generator means 50 includes a timing gate generator circuit 51 and a burst wave generator circuit 52. The timing gate generator circuit 51 generates the burst transmission timing gate signal G1 for determining the generation timing of the burst wave signal V0. In response to the burst transmission timing gate signal G1, the burst wave generator circuit 52 generates burst wave signal V0.

The dry/wet road surface condition detector 10 includes a received-wave intensity detector 20, an ultrasonic noise intensity detector circuit 40, a comparator 31 arid a reference voltage setting circuit 32. The operations of the received-wave intensity detector 20, the comparator 31, and the reference voltage setting circuit 32 are similar to those of the corresponding parts of circuits of FIGS. 1, 4 and 6. The ultrasonic noise intensity detector circuit 40, on the other hand, includes a minimum level detector 43 and an integrator circuit 44 and detects the intensity of the ultrasonic noise on the basis of the received-signal intensity signal V4 and burst transmission timing gate signal G1. The minimum level detector 43 determines the minimum levels of the received-signal intensity signal V4 during the intervals when the reflection of the burst wave is not received. The intervals of time when the reflection of the burst wave is not received are determined on the basis of the burst transmission timing gate signal G1. The integrator circuit 44 integrates the minimum value signal V5 output from the minimum level detector 43 to obtain an ultrasonic noise intensity signal V7.

The minimum level detector 43 of the ultrasonic noise intensity detector circuit 40 is reset in synchronism with each rising edge of the burst transmission timing gate signal G1, and holds the minimum level of the received-signal intensity signal V4 which is reached during the preceding period of the burst transmission timing gate signal G1. The integrator circuit 44 integrates the minimum value signal V5, thereby averaging the level thereof for a predetermined length of time, and outputs the result of integration as the ultrasonic noise intensity signal V7.

The comparator 31 compares the level of the ultrasonic noise intensity signal V7 with the reference voltage Vt to obtain the logical judgment signal V10. When the level of the ultrasonic noise intensity signal V7 is less than the reference voltage Vt, the judgment signal V10 is at the low level L. When, on the other hand, the level of the ultrasonic noise intensity signal V7 is greater than the reference voltage Vt, the judgment signal V10 is at the high level H.

FIG. 10 is a timing chart showing the waveforms of various signals in the circuit of FIG. 9. The time span shown in FIG. 10 corresponds to the transient time when the road surface R changes from the dry to a wet road surface condition. The intensity of the burst wave reflection signal is thus reduced during this interval. On the other hand, the intensity of the ultrasonic noise increases considerably.

As shown by the top curve in FIG. 10, the burst transmission timing gate signal G1 consists of a train of pulses generated at a predetermined period. The burst wave signal V0 is generated in synchronism with the high levels of the burst transmission timing gate signal G1. Theoretically, the bursts of the amplified waveform signal V2, which correspond to the reflections from the road surface R, are delayed from the corresponding bursts of the burst wave signal V0. Actually, however, the most prominent bursts of the amplified waveform signal V2 are observed in synchronism with those of the burst wave signal V0, as shown by the waveform V2 in FIG. 10. The reflections of the burst waves from the road surface R is delayed by a time length which depends on the vehicle height, the ambient temperature, etc.

At the period T1 of the burst transmission timing gate signal G1, the level of the minimum value signal V5 output from the minimum level detector 43 holds the minimum level of the absolute level signal V3 which is reached during the preceding period T0. During the next period T2, the minimum value signal V5 holds the minimum level of the absolute level signal V3 reached during the period T1. Similarly, during the period T3, the minimum value signal V5 holds the minimum level of the absolute level signal V3 reached during the period T2. Thus, during each period of the burst transmission timing gate signal G1, the minimum value signal V5 holds the minimum level of the absolute level signal V3 that is reached during the preceding period. The minimum level of the absolute level signal V3 is not affected by the reflection of the burst wave. The level of the minimum value signal V5 thus represents the intensity of the ultrasonic noise as distinguished from the reflection of the burst waves. The integrator circuit 44 integrates the minimum value signal V5 to take a time average thereof over a predetermined length of time, thereby obtaining the ultrasonic noise intensity signal V7. The ultrasonic noise intensity signal V7 thus represents accurately the current dry/wet road surface condition of the road surface R.

As described above, in the case of the circuit of FIGS. 7 and 9, the ultrasonic noise intensity signal V7 is extracted from the received-signal intensity signal V4 by means of the minimum level detector 43, such that, in spite of the presence of the ultrasonic bursts transmitted periodically from the ultrasonic wave transmitter/receiver units 3a and 3b, the dry/wet road surface condition can be determined accurately and reliably. The circuit of FIGS. 7 and 9 has the further advantage that the production cost is reduced since the ultrasonic wave transmitter/receiver units 3a and 3b are shared by the dry/wet road surface condition detector 10 and other road condition judgment means.

Figure 11:
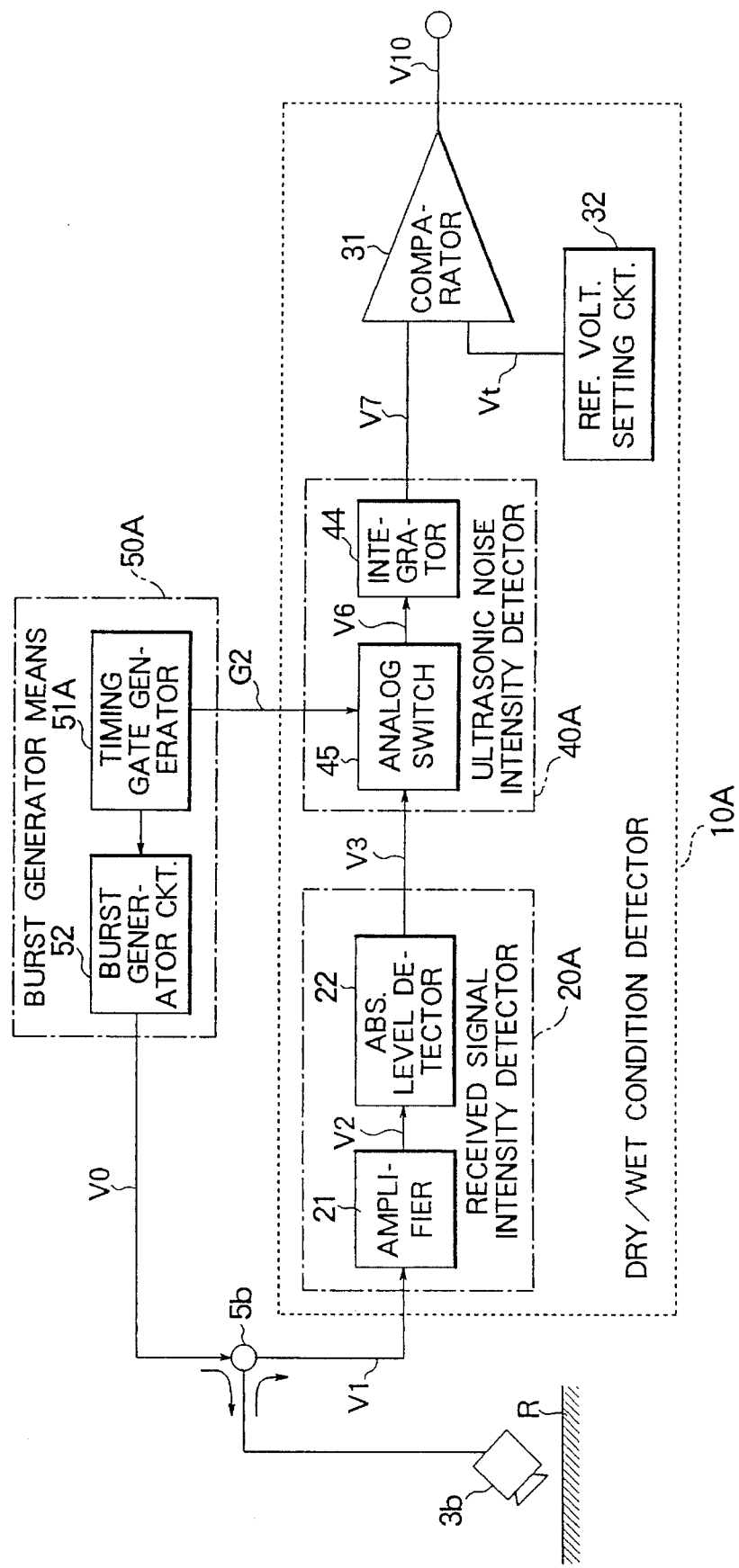
FIG. 11 is a block diagram of a part of the circuit corresponding to that of FIG. 9, but showing another embodiment thereof according to this invention.
Figure 12:
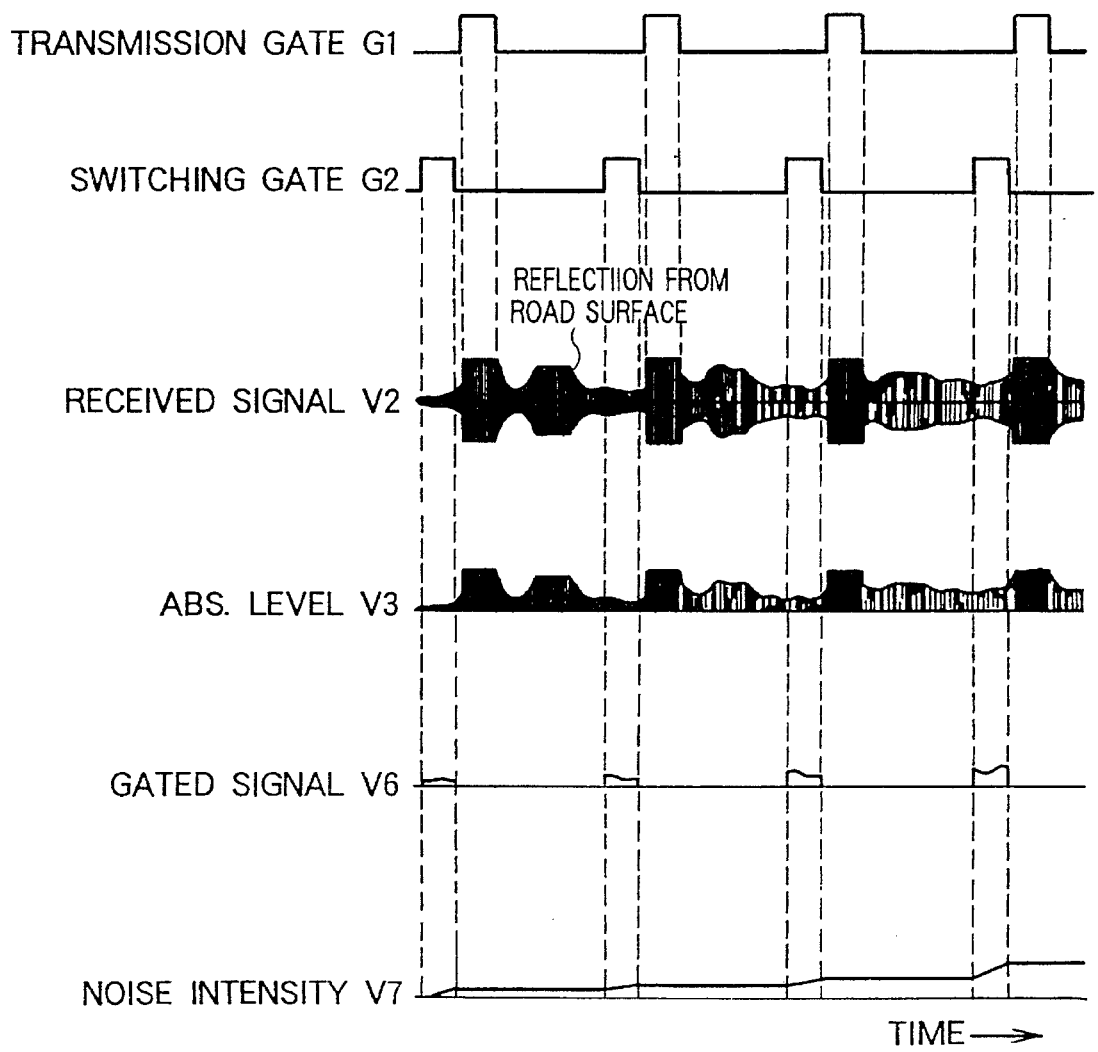
FIG. 12 is a timing chart showing the waveforms of the various signals generated in FIG. 11.

FIG. 11 is a block diagram of a part of the circuit corresponding to that of FIG. 9, but showing another embodiment thereof according to this invention. In FIG. 11, the smoothing circuit 23 of the received-wave intensity detector 20 of FIG. 9 is dispensed with and the minimum level detector 43 of the ultrasonic noise intensity detector circuit 40 of FIG. 9 is replaced by an analog switch 45 of the ultrasonic noise intensity detector circuit 40A. The ultrasonic wave transmitter/receiver unit 3b, the transmission/reception switching circuit 5b, the amplifier 21, the absolute level detector 22, the comparator 31, the reference voltage setting circuit 32, the integrator circuit 44 and the burst wave generator circuit 52 are similar in operation and structure to those of FIG. 9. Further, the dry/wet road surface condition detector 10A, the received-wave intensity detector 20A, the ultrasonic noise intensity detector circuit 40A, the burst wave generator means 50A and the timing gate generator circuit 51A correspond to the dry/wet road surface condition detector 10, the received-wave intensity detector 20, the ultrasonic noise intensity detector circuit 40, the burst wave generator means 50 and the timing gate generator circuit 51 of FIG. 9. FIG. 12 is a timing chart showing the waveforms of the various signals generated in FIG. 11.

The timing gate generator circuit 51A of the timing gate generator circuit 51A outputs a burst transmission timing gate signal G1 to the burst wave generator circuit 52 and a switching gate signal G2 to the analog switch 45. As shown in FIG. 12, the switching gate signal G2 consists of a train of pulses which is advanced for a short time length relative to the burst transmission timing gate signal G1, such that the high levels of the corresponding pulses of the two gate signals G1 and G2 do not overlap.

Within the received-wave intensity detector 20A, the amplifier 21 outputs the amplified waveform signal V2, and the absolute level detector 22 outputs the absolute level signal V3. The absolute level signal V3 is supplied to the ultrasonic noise intensity detector circuit 40A as the output of the received-wave intensity detector 20A.

The analog switch 45 of the ultrasonic noise intensity detector circuit 40A is closed to transmit the absolute level signal V3 therethrough only when the switching gate signal G2 is at the high level H. As described above, the high level H of the switching gate signal G2 occurs immediately before the high level H of the burst transmission timing gate signal G1 during which the bursts are transmitted from the ultrasonic wave transmitter/receiver unit 3b. The high levels of the switching gate signal G2 are out of the time intervals during which the reflections of the burst waves are received. Thus, the analog switch 45 is closed to transmit, the absolute level signal V3 therethrough only when the absolute level signal V3 contains exclusively the ultrasonic noise component picked up by the ultrasonic wave transmitter/receiver unit 3b. The gated absolute level signal V6, which is output from the analog switch 45 to the integrator circuit 44 in synchronism with the high level H of the switching gate signal G2, is integrated by the integrator circuit 44 for a predetermined length of time to obtain the ultrasonic noise intensity signal V7. The ultrasonic noise intensity signal V7 thus corresponds to the time average of the ultrasonic noise intensity. As shown at the bottom in FIG. 12, the level of the ultrasonic noise intensity signal V7 varies only during the high level H of the switching gate signal G2, since the gated absolute level signal V6 is generated only when the switching gate signal G2 is at the high level H.

The comparator 31 compares the level of the ultrasonic noise intensity signal V7 with the reference voltage Vt to obtain the logical judgment signal V10. When the level of the ultrasonic noise intensity signal V7 is less than the reference voltage Vt, the judgment signal V10 is at the low level L. On the other hand, when the level of the ultrasonic noise intensity signal V7 is greater than the reference voltage Vt, the judgment signal V10 is at the high level H.

In the case of the circuit of FIG. 11, the smoothing circuit 23 of FIG. 9 can be dispensed with and an inexpensive analog switch 45 accomplishes the function of the minimum level detector 43 of FIG. 9. Thus, the circuit can be produced at a less cost.

Figure 13:
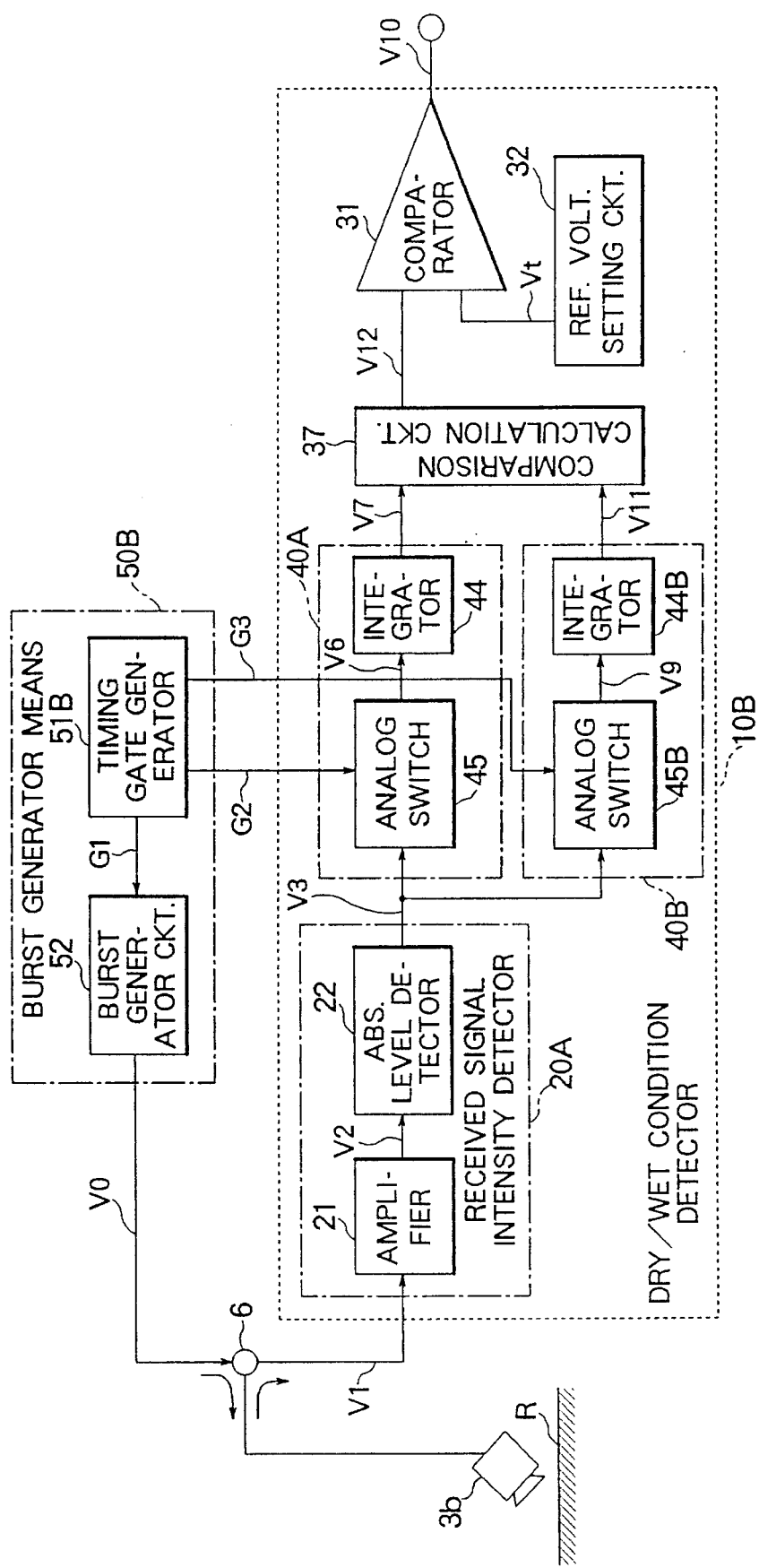
FIG. 13 is a block diagram of a part of the circuit corresponding to that of FIG. 9, but showing still another embodiment thereof according to this invention.
Figure 14:
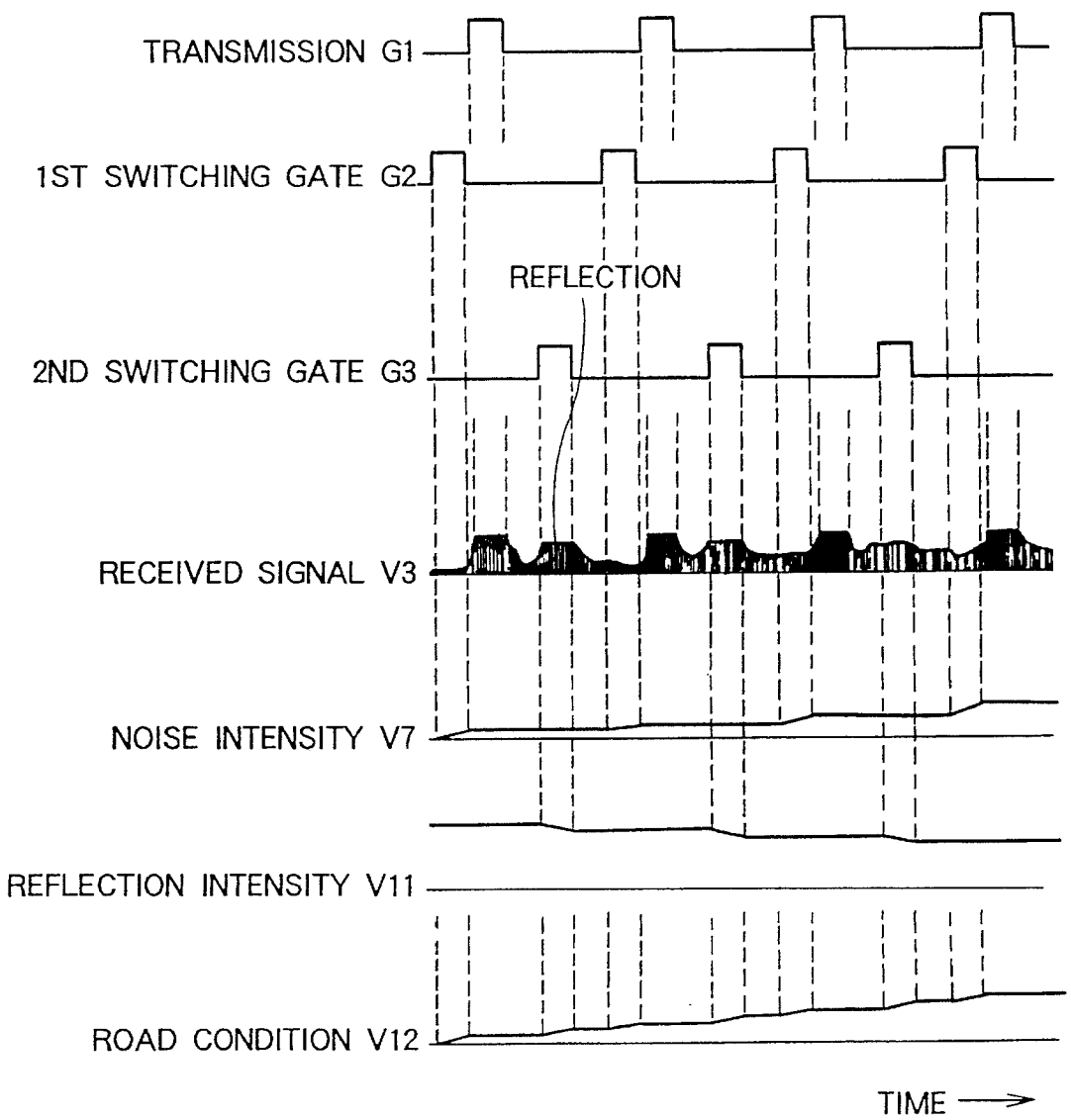
FIG. 14 is a timing chart showing the waveforms of the various signals generated in FIG. 13.

FIG. 13 is a block diagram of a part of the circuit corresponding to that of FIG. 9, but showing still another embodiment thereof according to this invention. FIG. 14 is a timing chart showing the waveforms of the various signals generated in FIG. 13. The circuit of FIG. 13 is similar to that of FIG. 11, except that: (1) the timing gate generator circuit 51B of the burst wave generator means 50B generates a second switching gate signal G3; (2) the dry/wet road surface condition detector 10B includes a reflection burst wave intensity detector circuit 40B; and (3) the outputs of the ultrasonic noise intensity detector circuit 40A and the reflection burst wave intensity detector circuit 40B are compared by the comparison calculation circuit 37 to obtain a road surface condition indicator signal V12. The received-wave intensity detector 20A, the ultrasonic noise intensity detector circuit 40A, the comparator 81, the reference voltage setting circuit 82 and the burst wave generator circuit 52 are similar to those of FIG. 11.

The first switching gate signal G2 generated by the timing gate generator circuit 51B corresponds to the switching gate signal G2 generated by the timing gate generator circuit 51A of FIG. 11. On the other hand, the high levels of the second switching gate signal G3 generated by the timing gate generator circuit 51B is displaced from those of the burst transmission timing gate signal G1 by a predetermined length of time such that the high levels of the switching gate signal G3 are within the respective time intervals during which the reflections of the burst waves from the road surface R are received. The timing relationship of the burst transmission timing gate signal G1, the switching gate signal G2, the switching gate signal G3 and the peaks of the transmitted and the received bursts (illustrated by the curve V3) are shown in FIG. 14.

The absolute level signal V3 output from the received-wave intensity detector 20A is supplied both to the ultrasonic noise intensity detector circuit 40A and the reflection burst wave intensity detector circuit 40B. The reflection burst wave intensity detector circuit 40B has a structure similar to that of the ultrasonic noise intensity detector circuit 40A and includes a reflection burst wave intensity detector circuit 40B and an integrator circuit 44B. However, the analog switch 45B thereof is closed in response to the high levels of the switching gate signal G3. Thus, the analog switch 45B is closed to transmit the absolute level signal V3 therethrough only during the time when the reflection of the bursts are received from the road surface R. The level of the second gated absolute level signal V9 output from the analog switch 45B thus corresponds to the instantaneous intensity of the reflected ultrasonic burst wave. The integrator circuit 44B integrates the gated absolute level signal V9 for a predetermined length of time to obtain the reflection wave intensity signal V11, which corresponds to the time average of the reflection burst wave intensity. On the other hand, the ultrasonic noise intensity signal V7 output from the ultrasonic noise intensity detector circuit 40A corresponds to that of FIG. 11 and thus represents the average ultrasonic noise intensity. The ultrasonic noise intensity signal V7 and the reflection wave intensity signal V11 output from the ultrasonic noise intensity detector circuit 40A and the reflection burst wave intensity detector circuit 40B, respectively, are input to the comparison calculation circuit 37.

In FIG. 14, it is assumed that the road surface is becoming increasingly wet. The level of the ultrasonic noise intensity signal V7 thus increases, and the level of the reflection wave intensity signal V11 decreases. The reason is as follows. When the road surface is dry, the intensity of random reflection at the road surface R is great. However, when the road surface is covered with water, small projections on the road surface is hidden below the water membrane. As a result, the most part of the ultrasonic wave transmitted from the ultrasonic wave transmitter/receiver unit 3b undergoes the mirror reflection at the road surface R and is not transmitted back to the ultrasonic wave transmitter/receiver unit 3b. Thus, the level of reflection wave intensity signal V11 is reduced as the road surface is covered increasingly with water. The level of the ultrasonic noise intensity signal V7, on the other hand, rises as the road surface becomes wet due to the noise creased by the splashing water, etc. To summarize, the level of ultrasonic noise intensity signal V7 is low and that of the reflection wave intensity signal V11 is high when the road surface is dry. On the other hand, the Level of ultrasonic noise intensity signal V7 is high and that of the reflection wave intensity signal V11 is low when the road surface is wet. Thus, the dry/wet road surface condition can be determined more accurately and reliably if the road surface condition is judged on both the ultrasonic noise intensity signal V7 and the reflection wave intensity signal V11.

In view of the above, the comparison calculation circuit 37 calculates the difference V11−V7 or the quotient V7/V11 as the road surface condition indicator signal V12. The comparator 31 compares the level of the road surface condition indicator signal V12 with the reference voltage Vt to obtain the logical judgment signal V10.

It is noted that, in the circuits of FIGS. 9, 11, and 13, the level of the reference voltage Vt may be varied as in the case of the circuit of FIG. 4. Further, a microcomputer (similar to the microcomputer 36 of FIG. 6) may be used instead of the comparator 31.

What is claimed is:

1. A road surface condition detector for an automotive vehicle for detecting a dry/wet condition of a road surface, comprising:

receiver means mounted on a body of an automotive vehicle for receiving ultrasonic noise generated by a road wheel tire of said automotive vehicle, said receiver means being arranged on the body so as to be directed toward a contact surface between said road wheel tire and a road surface;

intensity detector means, coupled to said receiver means, for detecting an intensity of said ultrasonic noise from an output of said receiver means and generating an intensity signal corresponding to said intensity of said ultrasonic noise; and judgement means, coupled to said intensity detector means, for determining a dry/wet condition of said road surface from said intensity signal output from said intensity detector means.

2. A road surface condition detector for detecting a dry/wet condition of a road surface as claimed in claim 1, wherein said judgment means includes comparison means for comparing a level of said output of said intensity detector means with a reference voltage level.

3. A road surface condition detector for detecting a dry/wet condition of a road surface as claimed in claim 2, further comprising:

vehicle speed detector means for detecting a vehicle speed of said automotive vehicle; and reference voltage setting circuit means, coupled to said vehicle speed detector means and to said comparison means, for setting said reference voltage level approximately proportionally to said vehicle speed.

4. A road surface condition detector for detecting a dry/wet condition of a road surface as claimed in claim 3, wherein said vehicle speed detector means detects a rotation speed of a road wheel of said automotive vehicle corresponding to said vehicle speed.

5. A road surface condition detector for detecting a dry/wet condition of a road surface as claimed in claim 1, wherein said intensity detector means comprises:

absolute level detector means, coupled to said receiver means, for detecting an absolute level of said output of said receiver means; and smoothing circuit means, coupled to said absolute level detector means, for smoothing said absolute level output from said absolute level detector means, thereby obtaining said intensity signal.

6. A road surface condition detector for detecting a dry/wet condition of a road surface as claimed in claim 2, wherein said comparison means comprises a comparator circuit.

7. A road surface condition detector for detecting a dry/wet condition of a road surface as claimed in claim 2, wherein said comparison means comprises a microcomputer.

8. A road surface condition detector for detecting a dry/wet condition of a road surface comprising:

receiver means mounted on a body of an automotive vehicle for receiving ultrasonic noise generated by a road wheel tire of said automotive vehicle, said receiver means exhibiting a directivity toward a contact surface between said road wheel tire and a road surface;

intensity detector means, coupled to said receiver means, for detecting an intensity of said ultrasonic noise from an output of said receiver means and generating an intensity signal corresponding to said intensity of said ultrasonic noise;

judgement means, coupled to said intensity detector means, for determining a dry/wet condition of said road surface from said intensity signal output from said intensity detector means;

transmitter means, mounted on said body of said automotive vehicle, exhibiting a directivity toward a contact surface between said road wheel tire and a road surface, for transmitting bursts of ultrasonic waves intermittently toward said road surface for reflection therefrom to said receiver means;

wherein said intensity detector means includes first extraction means, coupled to said receiver means, for extracting a first component corresponding to said ultrasonic noise from an output of said receiver means, said judgment means determining said road surface dry/wet condition from said first component extracted by said first extraction means.

9. A road surface condition detector for detecting a dry/wet condition of a road surface as claimed in claim 8, wherein:

said transmitter means transmits said ultrasonic wave bursts intermittently at a predetermined period; and said first extraction means comprises: minimum level detector means, coupled to said receiver means, for holding a minimum level of said output of said receiver means which is reached during each period of said ultrasonic wave bursts; and integrator circuit means, coupled to said minimum level detector means, for averaging said minimum levels output from said minimum level detector means, over a predetermined length of time.

10. A road surface condition detector for detecting a dry/wet condition of a road surface as claimed in claim 8, wherein:

said transmitter means transmits said ultrasonic wave bursts intermittently at a predetermined period; and said first extraction means comprises: an analog switch coupled to said receiver means and closed exclusively during intervals when a reflection of said ultrasonic wave bursts is not received by said receiver means, said analog switch thereby supplying said output of said receiver means containing exclusively said ultrasonic noise; and integrator circuit means, coupled to said analog switch, for averaging outputs from said analog switch over a predetermined length of time.

11. A road surface condition detector for detecting a dry/wet condition of a road surface as claimed in claim 8, wherein:

said intensity detector means includes second extraction means, coupled to said detector means, for extracting a second component corresponding to a reflection of said ultrasonic wave bursts from said output of said receiver means; and said judgment means comprises: comparison calculation circuit means, coupled to said first and said second extraction means, for calculating a road surface condition signal from said first and said second component; said judgment means determining said road surface dry/wet condition on the basis of said road surface condition signal.

12. A road surface condition detector for detecting a dry/wet condition of a road surface as claimed in claim 11, wherein:

said comparison calculation circuit means calculates a difference between said first and said second component as said road surface condition signal.

13. A road surface condition detector for detecting a dry/wet condition of a road surface as claimed in claim 11, wherein:

said comparison calculation circuit means calculates a ratio of said first and said second component as said road surface condition signal.

14. A road surface condition detector for detecting a dry/wet condition of a road surface as claimed in claim 8, wherein said intensity detector means comprises:

absolute level detector means, coupled to said receiver means, for detecting an absolute level of said output of said receiver means; and smoothing circuit means, coupled to said absolute level detector means, for smoothing said absolute level output from said absolute level detector means;

wherein said first extraction means is coupled to said smoothing circuit means and extracts said first component from an output of said smoothing circuit means.

15. A road surface condition detector for detecting a dry/wet condition of a road surface as claimed in claim 11, wherein said intensity detector means comprises:

absolute level detector means, coupled to said receiver means, for detecting an absolute level of said output of said receiver means; and smoothing circuit means, coupled to said absolute level detector means, for smoothing said absolute level output from said absolute level detector means;

wherein said first and said second extraction means are coupled to said smoothing circuit means and extracts said first and said second component from an output of said smoothing circuit means.

* * * * *